United States Patent [19]
Munekata

[11] Patent Number: 5,103,358
[45] Date of Patent: Apr. 7, 1992

[54] DISK DRIVE UNIT HAVING A TURNTABLE WITH A PROJECTION TO ASSURE PROPER DISK MOUNTING

[75] Inventor: Kazumi Munekata, Kanagawa, Japan

[73] Assignee: Sony Corporation, Tokyo, Japan

[21] Appl. No.: 434,785

[22] Filed: Nov. 13, 1989

[30] Foreign Application Priority Data

Nov. 22, 1988 [JP] Japan .................. 63-295649

[51] Int. Cl.⁵ .................. G11B 5/016; G11B 23/00
[52] U.S. Cl. .................. 360/99.04; 360/99.08; 360/99.12; 369/270
[58] Field of Search .......... 360/99.04, 99.08, 99.05, 360/99.09, 99.11, 99.12, 97.01, 133, 135; 369/258, 261, 270, 271, 282

[56] References Cited

U.S. PATENT DOCUMENTS

| | | | |
|---|---|---|---|
| 4,445,155 | 4/1984 | Takahashi et al. | 360/99.04 |
| 4,758,915 | 7/1988 | Sakaguchi | 360/99.04 |
| 4,873,595 | 10/1989 | Taguchi et al. | 360/99.08 X |

*Primary Examiner*—Robert S. Tupper
*Assistant Examiner*—Andrew L. Sniezek
*Attorney, Agent, or Firm*—Ronald P. Kananen

[57] ABSTRACT

A disk drive unit has a turntable in which a central pin projecting from the center of a disk mounting surface, a drive pin projecting from an eccentric position spaced away from the position of the central pin, and a magnet for making the disk attract to the disk mounting surface are provided. The central pin and the drive pin are fitted in respective insertion holes provided in the core of the disk, while the core is fixed to the disk mounting surface due to attractive force of the magnet, so that the disk may be rotated by the turntable. Further, an arc-like projection having a predetermined height a little smaller than that of the disk mounting surface is so provided on the turntable as to extend outside the disk mounting surface and that along the outer edge of the turntable. The arc-like projection and the drive pin are disposed on opposite sides of the central pin. Thus, the core of the disk is prevented from being mounted on the disk mounting surface in a slanted state when information is to be recorded on reproduced from the disk.

4 Claims, 8 Drawing Sheets

DISK DRIVE UNIT HAVING A TURNTABLE WITH A PROJECTION TO ASSURE PROPER DISK MOUNTING

BACKGROUND OF THE INVENTION

1. Field of the Invention

This invention relates generally to a disk drive unit, and is particularly but not exclusively applicable to a disk drive unit for rotating a micro floppy disk, for example, comprising a magnetic sheet having a diameter of 3½ inches.

2. Description of the Prior Art

There is a prior art micro floppy disk drive unit, for example, disclosed in the specification of U.S. Pat. No. 4,445,155 which has been granted to the applicant of this invention.

Figure 5:
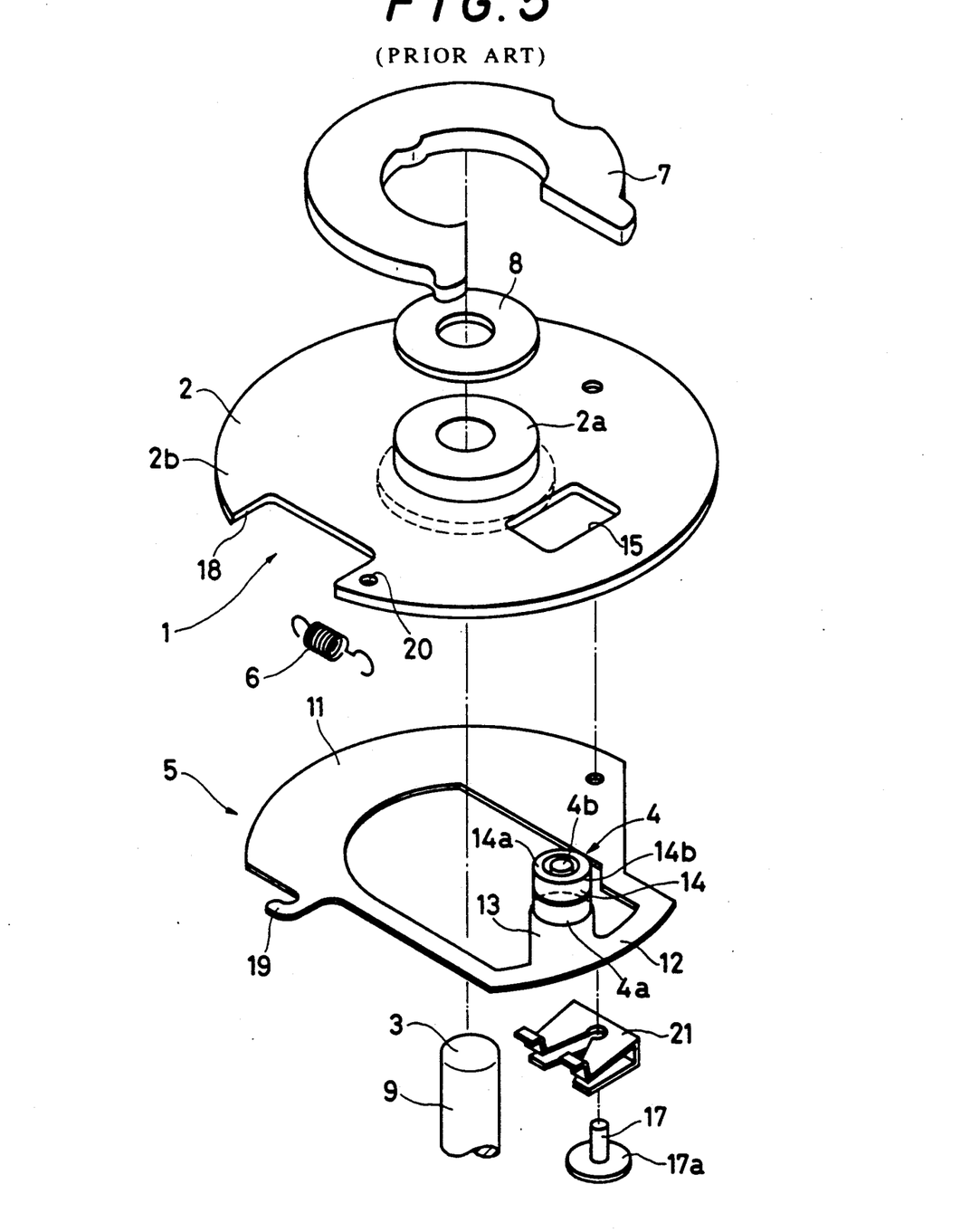
FIG. 5 is an exploded perspective view of a disk drive unit of the previously-proposed kind.
Figure 6:
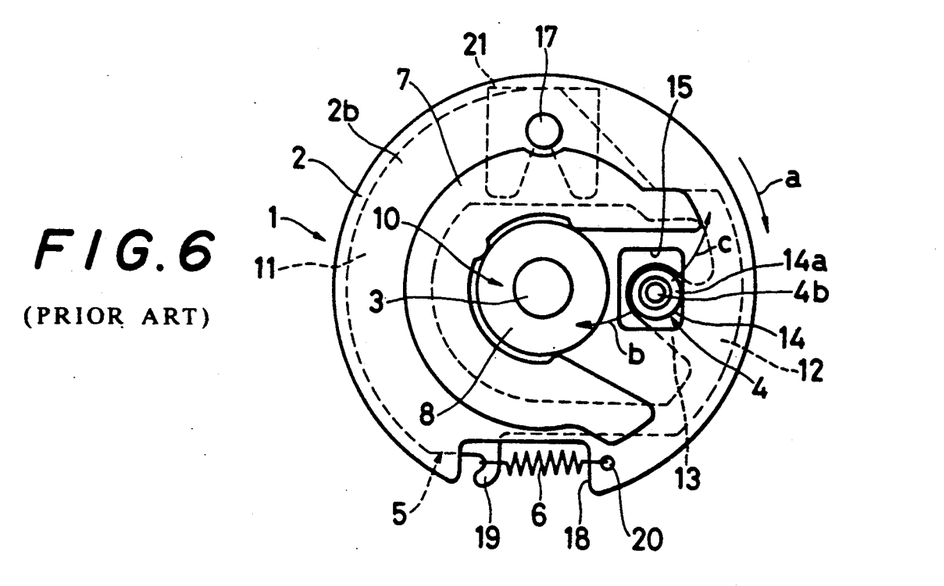
FIG. 6 is a plan view of a turntable incorporated in the disk drive unit of FIG. 5.
Figure 7:
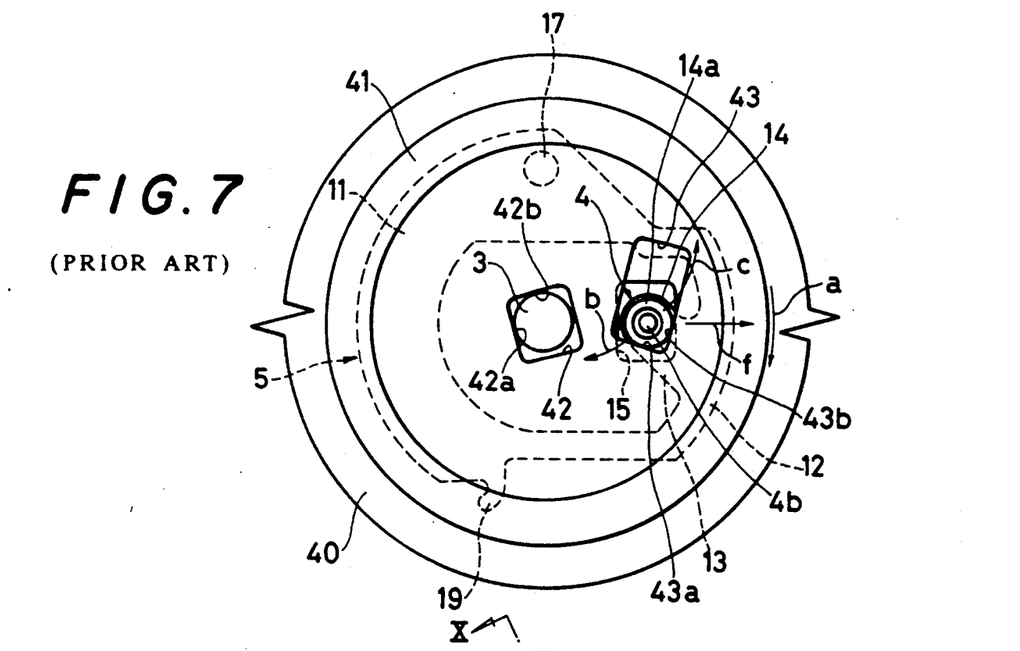
FIGS. 7 and 8 are plan views of the disk drive unit of FIG. 5.

As shown in FIGS. 5 to 7, a turntable 1 of the prior art comprises a rotatable base plate 2, a central pin 3, a drive pin 4, a supporting plate 5, a spring 6, a magnet 7 and a low friction sheet 8. The rotatable base plate 2 has a substantially circular shape and is fixed to the shaft 9 of a motor (not shown) by a force fit. The central pin 3 is provided at the top of the motor shaft 9.

The substantially C-shaped magnet 7 is made of an elastic magnet, and is adhered to the upper surface 2b of the base plate 2 around the boss 2a of the base plate 2. The circular low friction sheet 8 is made of non-magnetic material, and is adhered to the upper surface of the boss 2a so as to surround the central pin 3. The upper surface of the low friction sheet 8 functions as a disk mounting surface 10.

Figure 9:
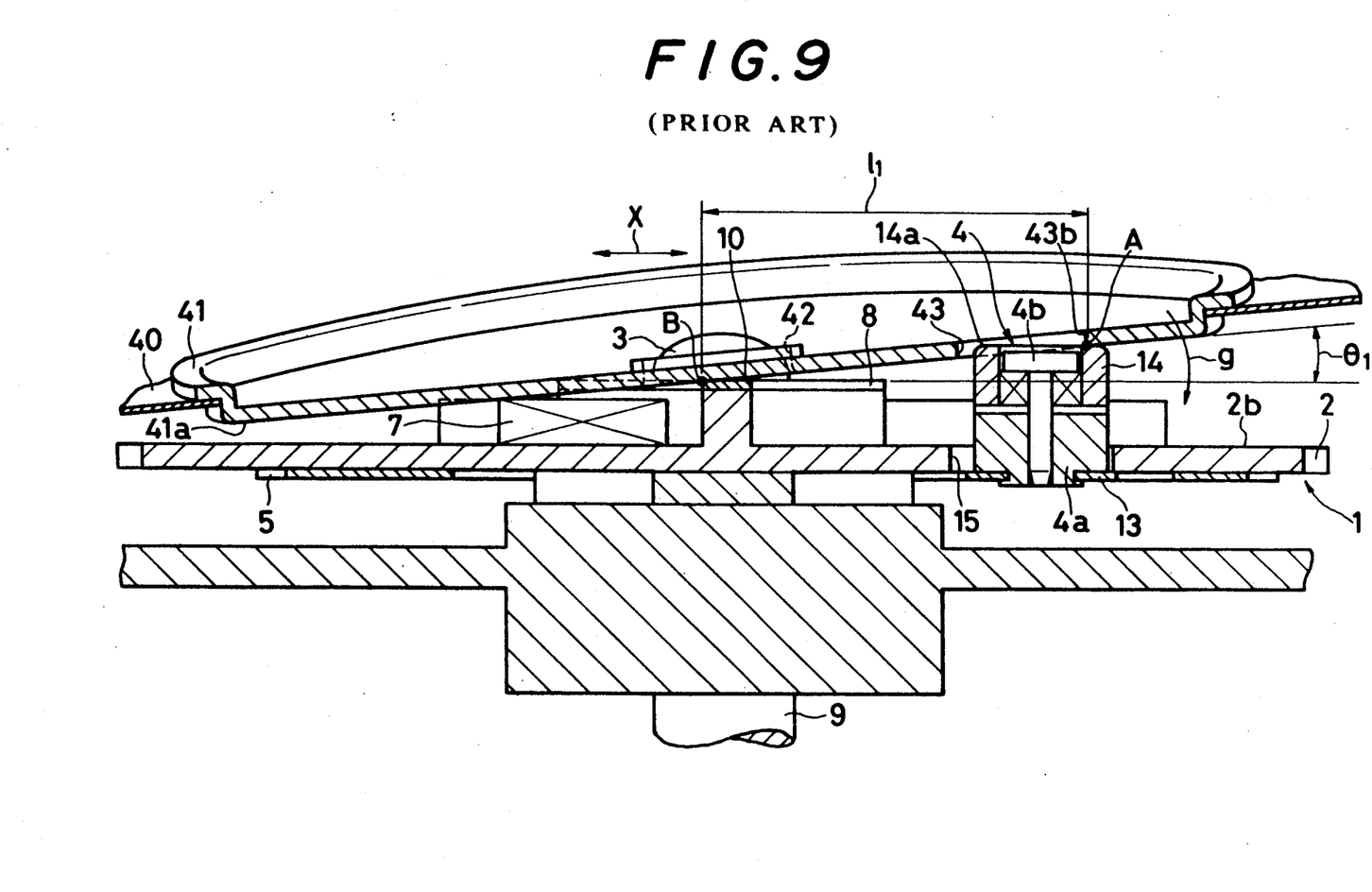
FIG. 9 is a sectional view taken along the line IX—IX on FIG. 8 on an enlarged scale.

The substantially annular supporting plate 5 comprises a substantially U-shaped wide nonelastic portion 11 and a substantially U-shaped narrow elastic portion 12. An elastic projection 13 projects substantially from the center of the inside edge of the elastic portion 12, and the drive pin 4 is vertically secured to the elastic projection 13. The drive pin 4 comprises a bearing 14 and a bearing stand 4a. As shown in FIG. 9, a cylindrical head pin 4b is fitted, from above the bearing 14, into the hole of the bearing 14, and then fitted by a force fit into a hole of the bearing stand 4a that is fixed to the elastic projection 13 by upsetting, so that the bearing 14 is rotatable on the bearing stand 4a.

Figure 10:
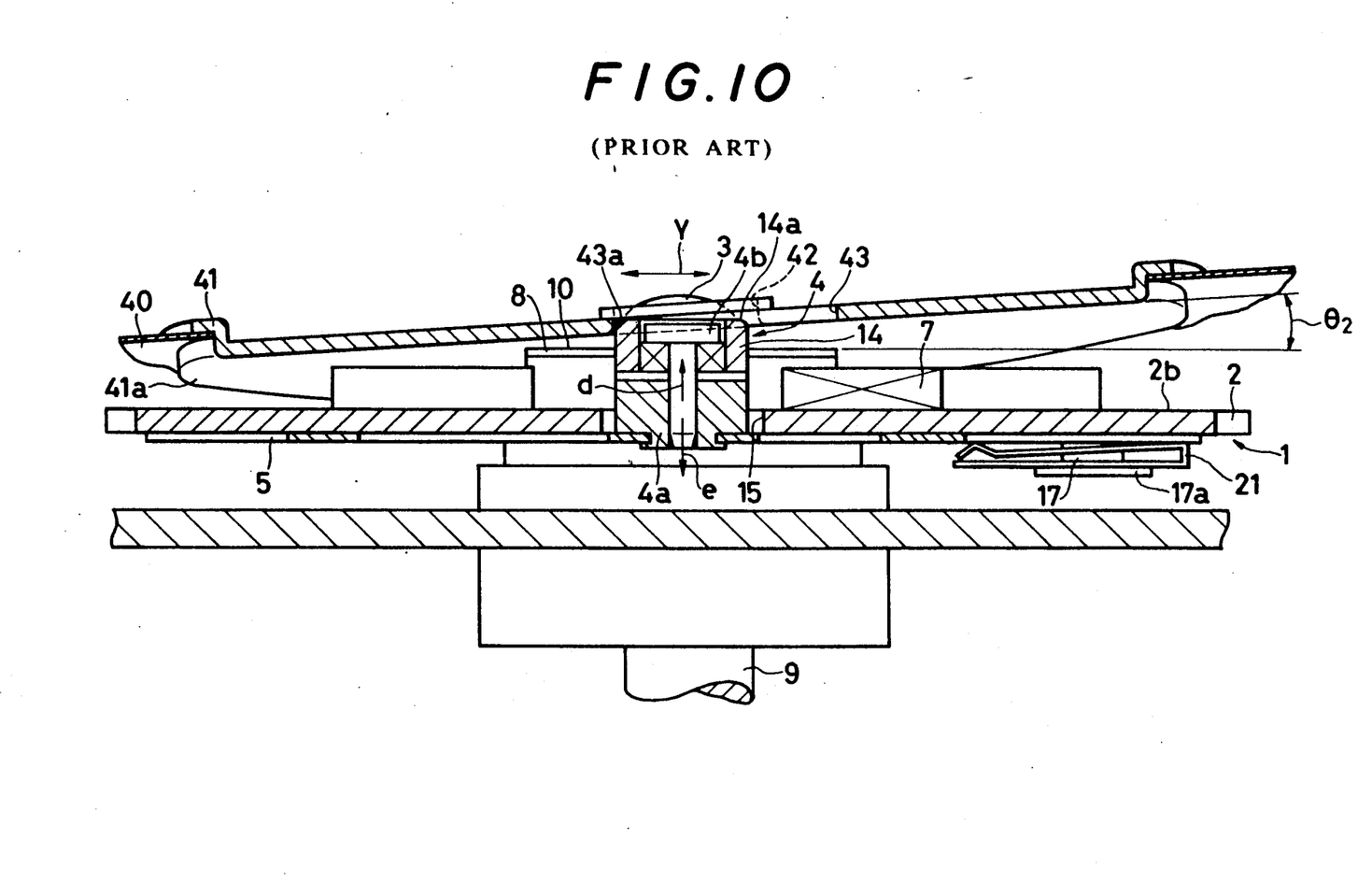
FIG. 10 is a sectional view taken along the line X—X on FIG. 8 on an enlarged scale.

The supporting plate 5 is arranged on the lower face of the base plate 2, and the drive pin 4 projects upwards through a through hole 15 which is provided in the base plate 2. A fulcrum shaft 17 is fitted, from below the base plate 2, into a hole of the base plate 2, which is spaced away from the drive pin 4 substantially at a central angle of 90° in the direction of reverse rotation of the turntable 1, and is vertically fixed to the base plate 2 by upsetting. Thus, the supporting plate 5 is rotatably secured to the base plate 2 through the fulcrum shaft 17. That is, the supporting plate 5 is horizontally rotatable on the fulcrum shaft 17 in the direction of the arrows b and c (FIG. 6). Further, since a U-shaped leaf spring 21 is mounted on the fulcrum shaft 17 to be interposed between the cylinder head 17a of the fulcrum shaft 17 and the supporting plate 5, the supporting plate 5 is also vertically rotatable in the direction of the arrows d and e (FIG. 10).

The tension coiled spring 6 is accommodated in a notch 18 provided on the outer periphery of the base plate 2, and stretched between a pair of spring stops 19 and 20 which are provided in the supporting plate 5 and the base plate 2, respectively, so that the drive pin 4 on the supporting plate 5 is urged in a direction departing from the center of the base plate 2, in the direction of the arrow c in FIG. 6.

A core 41, provided at the center of a micro floppy disk 40 (hereinafter described as a "disk") and made of stainless steel, has a central-pin insertion hole 42 of a substantially square shape in the central position thereof, and a drive-pin insertion hole 43 of a substantially rectangular shape in an eccentric position thereof. When the disk 40 is mounted on the disk mounting surface 10 of the turntable 1 as shown in FIG. 7, the central pin 3 and the drive pin 4 of the turntable 1 are inserted into the respective holes 42 and 43, and the core 41 is horizontally mounted on the disk mounting surface due to an attractive force of the magnet 7.

After the disk 40 is mounted, the turntable 1 is driven to rotate in the direction of arrow a, and the drive pin 4 fitted in the insertion hole 43 of the disk 40 is horizontally rotated on the fulcrum shaft 17 in the direction of the arrow b against a force of the spring 6. Next, the drive pin 4 presses the outer side 43b of the insertion hole 43 in a direction departing from the center of the turntable 1, in a direction of the arrow f, and presses the front side 43a of the insertion hole 43 in the direction of normal rotation, in the direction of the arrow a, so that the central pin 3 is pressed against two sides 42a and 42b of the central hole 42 which sides are adjacent to each other. Thus, the center of the disk 40 is accurately positioned by the central pin 3, and the disk 40 is rotated in the direction of the arrow a.

According to the disk drive unit of the prior art, the disk 40 is always accurately mounted on the predetermined position of the disk mounting surface 10 of the unit due to function of the drive pin 4, so that index positions (position reference signals) recorded on the disk 40 can be made constant.

Figure 8:
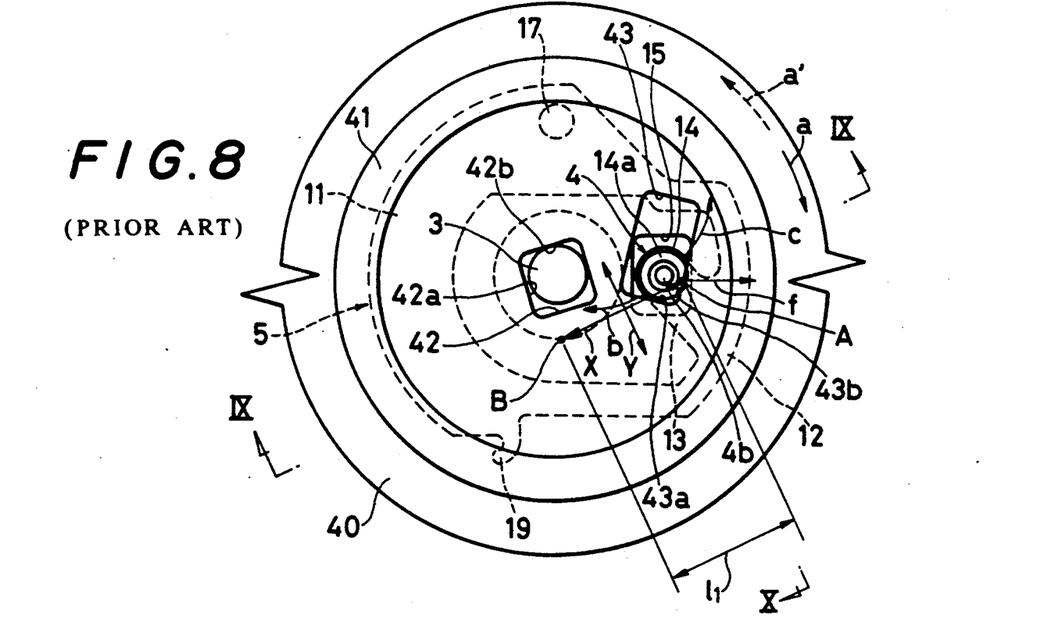

However, as shown in FIG. 8 to 10, if the outer side 43b of the insertion hole 43 of the disk 1 mounts on the outer part of the upper surface 14a of the bearing 14 at the time when the disk 40 is mounted on the turntable 1, the core 41 of the disk 40 often inclines two sides with respect to the disk mounting surface 10. That is, as shown in FIG. 9, the core 41 comes in contact with the outer part of the upper surface 14a of the bearing 14 at a point A, and the disk mounting surface 10 at a point B which is situated at a short distance $l_1$ from the point A. Thus, the core 41 inclines at a large angle $\theta_1$ in a direction of the arrow X, and inclines at a large angle $\theta_2$ in a direction of the arrow Y in FIG. 10, which is perpendicular to the arrow X.

As a result of an inclination of the angle $\theta_2$, the upper end of bearing 14 engages with the front side 43a of the insertion hole 43, and the disk 40 is rotated by the turntable 1 in the direction of the arrow a, so that it becomes impossible to reproduce information from the disk 40.

To overcome the above problem, it is widely accepted that the turntable 1 is first rotated in a reverse direction of the arrow a' in FIG. 8 after the disk 40 is mounted, and then rotated in the normal direction of the arrow a in FIG. 8 so as to make the bearing 14 completely fit in the insertion hole 43 as shown in FIG. 7. However, it brings a result that a control circuit of the motor used for rotating the turntable 1 becomes complicated, and thereby, production costs will rise.

OBJECTS AND SUMMARY OF THE INVENTION

Accordingly, it is an object of the present invention to provide a disk drive unit in which the core of a disk is prevented from being mounted on a turntable in a slanted state so as to be capable of recording or reproducing information accurately.

Another object of the invention is to provide a disk drive unit in which a projection provided on a turntable does not interfere with a disk being normally mounted, and thereby, the disk is always set in a predetermined mounted position to make it sure to record or reproduce information.

A further object of the invention is to provide a disk drive unit in which the core of a disk is horizontally mounted, for certain, on a turntable without reverse rotation of the turntable before its normal rotation, and thereby, the control circuit of a motor which drives the turntable is made simple so that production costs may be reduced.

Still a further object of the invention is to provide a disk drive unit in which an arc-like projection is merely added to a turntable to make it sure to mount a disk on the turntable, so that the invention is simply applicable to various disk drive units of the previously-proposed kind.

In accordance with an aspect of this invention, in a disk drive unit, a central pin projecting from the center of a disk mounting surface, a drive pin projecting from an eccentric position spaced away from the position of the central pin, and a magnet for making a disk attract to the disk mounting surface are provided in a turntable. The central pin and the drive pin are fitted in respective insertion holes provided in the core of the disk, while the core is fixed to the disk mounting surface due to an attractive force of the magnet so that the disk may be rotated by the turntable. Further, an arc-like projection having a predetermined height a little smaller than that of the disk mounting surface is so provided on the turntable as to extend outside the disk mounting surface and that along the outer edge of the turntable. The arc-like projection and the drive pin are disposed on opposite sides of the central pin.

DETAILED DESCRIPTION OF A PREFERRED EMBODIMENT

The reference numerals used in FIGS. 5 to 10, six views of the disk drive unit of previously-proposed kind, which is described in the "Description of the Prior Art", are also used in FIGS. 1A to 4, showing five views of a disk drive unit for rotating a micro floppy disk (hereinafter described), and will not be described again in detail.

Figure 1A:
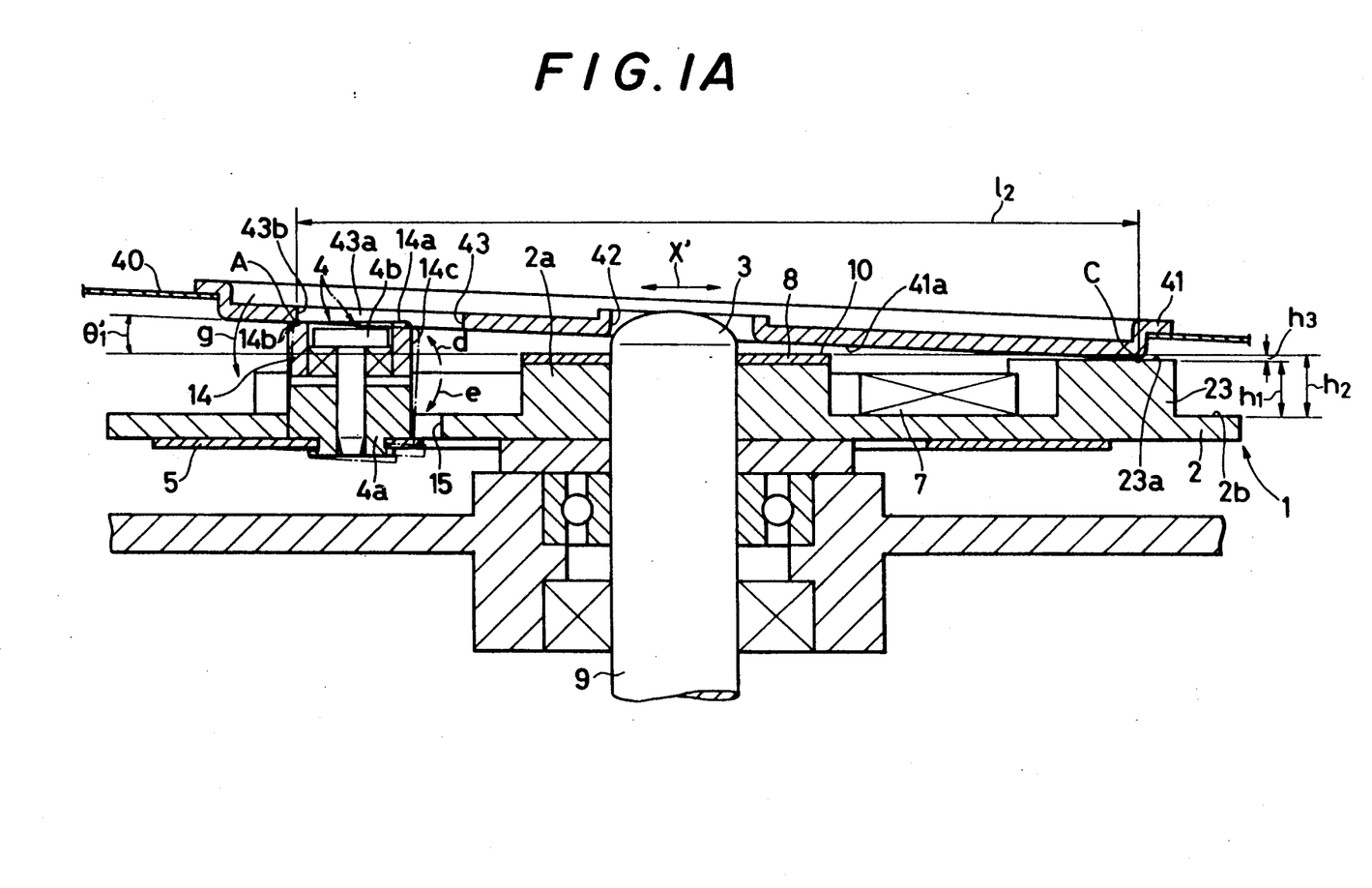
FIGS. 1A and 1B are sectional views, taken along the line I—I on FIG. 2, of a disk drive unit according to an embodiment of this invention.
Figure 2:
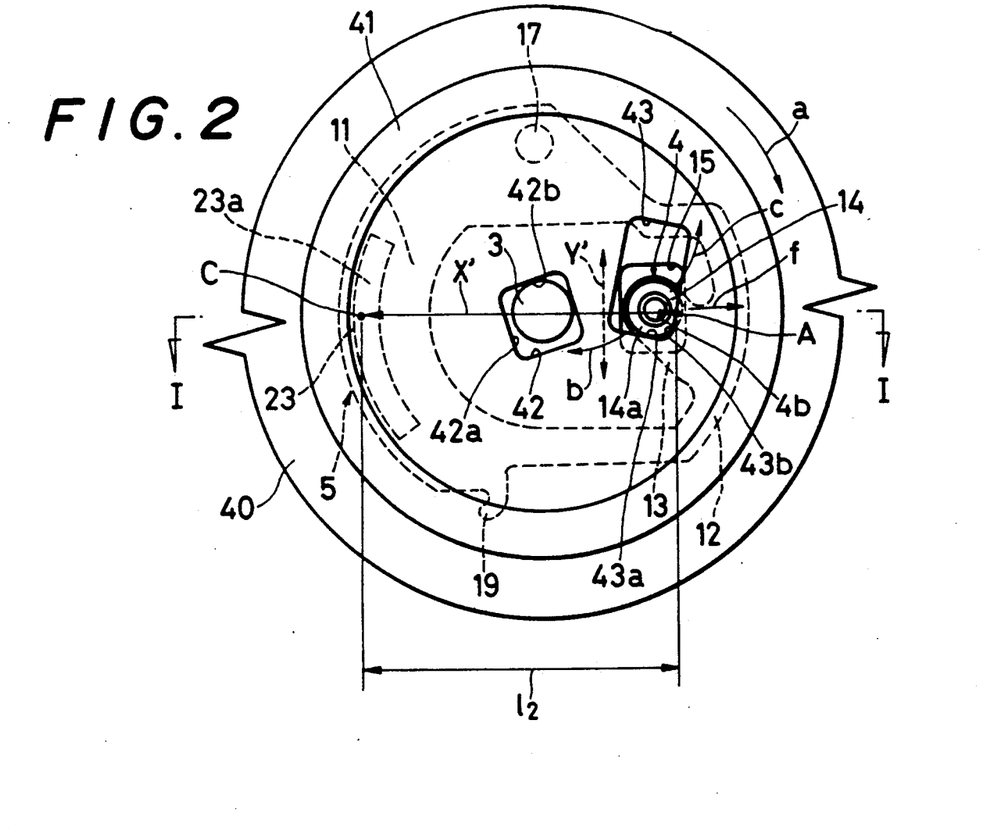
FIG. 2 is a plan view of the disk drive unit.
Figure 3:
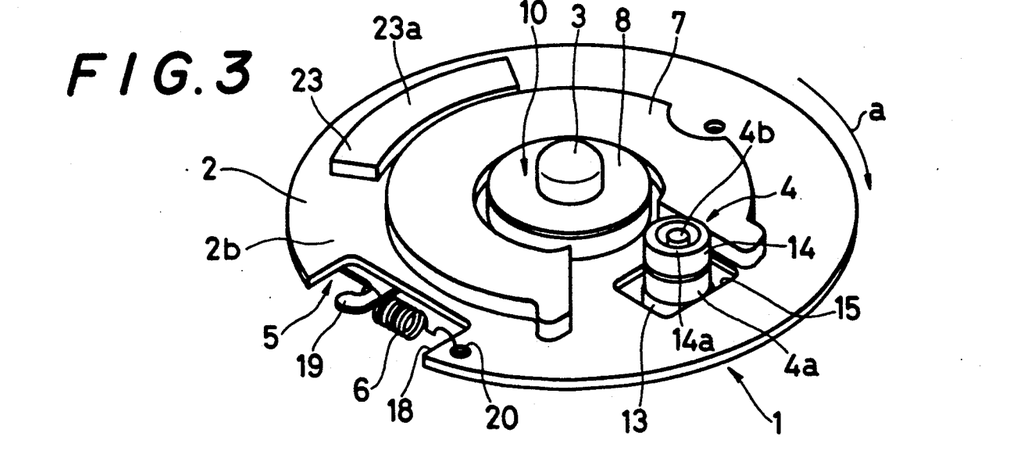
FIG. 3 is a perspective view of a turntable incorporated in the disk drive unit of FIG. 2.
Figure 4:
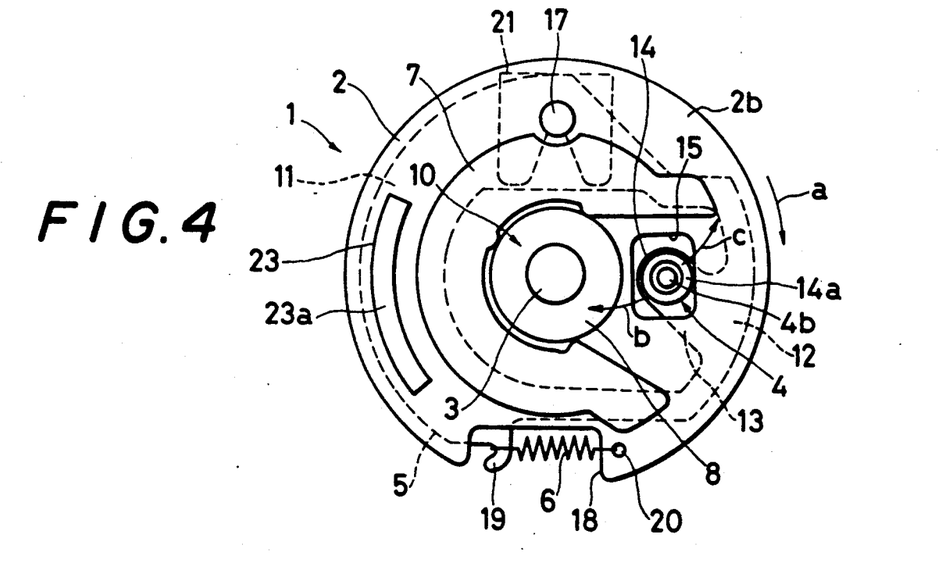
FIG. 4 is a plan view of the turntable of FIG. 3.

Referring to the drawings, and initially to FIGS. 1A and 2, the rotatable base plate 2 incorporated in the turntable 1 of the disk drive unit has an arc-like projection 23 on the upper surface 2b thereof. The arc-like projection 23 extends outside the disk mounting surface 10 and that along the outer edge of the turntable 1. Further, the projection 23 and the drive pin 4 are disposed on opposite sides of the central pin 3.

The height $h_1$ of the projection 23 measured from the upper surface 2b of the base plate 2 is a little smaller than the height $h_2$ of the disk mounting surface 10 also measured from the upper surface 2b of the base plate 2, and the amount $h_3$ obtained by subtracting height $h_1$ from height $h_2$ is within 50 to 100 μm. Further, the arc of the projection 23 has substantially a central angle of 30° to 90°. It is to be noted that the upper surface 14a of the drive pin 4 of cylindrical shape is substantially flat, and the boundary 14b between the upper surface 14a and the cylindrical side surface 14c is chamfered to form into an arc in section.

In the disk drive unit mentioned above, if the outer side 43b of the insertion hole 43 in the core 4 mounts on the outer part of the upper surface 14a of the bearing 14 at the time when the disk 40 is mounted on the turntable 1, the core 41 comes in contact with both the outer part of the upper surface 14a of the bearing 14 at point A, and the upper surface 23a of the arc-like projection 23 at point C which is situated at a long distance $l_2$ from point A, so that the core 41 inclines at a very small angle $\theta_1'$ only in a direction of the arrow X'.

That is, the distance $l_2$ between the points A and C is larger than the distance $l_1$ between the points A and B shown in FIG. 9, so that the angle $\theta_1'$ becomes much smaller than the angle $\theta_1$. Further, the projection 23 is formed into an arc, so that the core 41 does not incline in a direction of the arrow Y' (FIG. 2), which is perpendicular to the direction of the arrow X'.

Figure 1B:
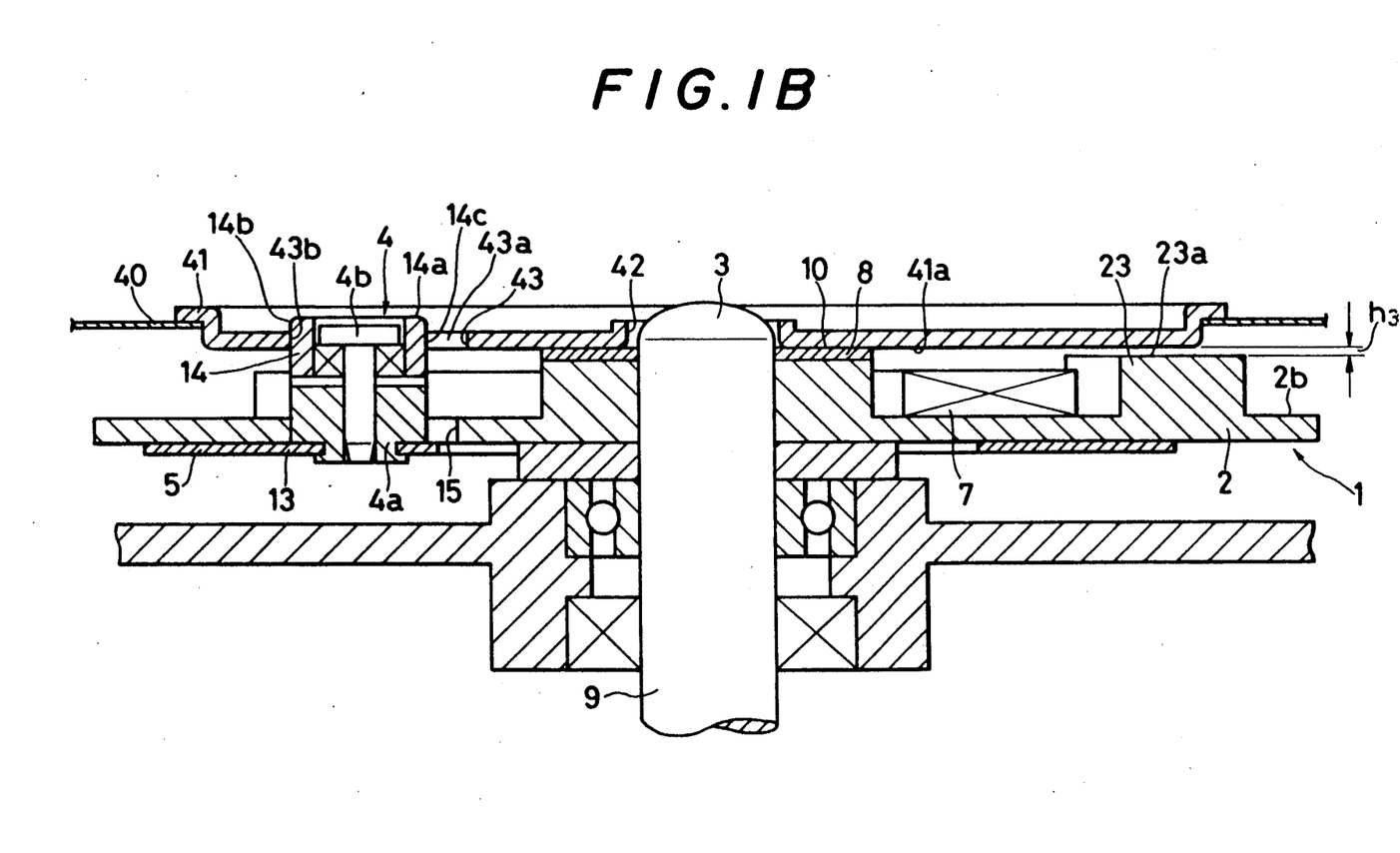

Thus, it scarcely occurs that the upper end of the bearing 14 engages with the front side 43a of the drive-pin insertion hole 43. Further, the angle $\theta_1'$ is very small, so that the outer side 43b of the insertion hole 43 easily slips off the chamfered portion 14b of the drive pin 4 in a direction of the arrow g in FIG. 1A. Therefore, the drive pin 4 is surely fitted in the insertion hole 43, and as shown in FIG. 1B, the core 41 is horizontally mounted on the disk mounting surface 10.

At that time, a gap $h_3$ is formed between the lower surface 41a of the core 41 and the upper surface 23a of the projection 23, so that the projection 23 does not interfere with the disk 40 being normally mounted. The bearing 14 is surely pressed against the outer side 43b of the insertion hole 43 in a direction of the arrow f in FIG. 7, and the front side 43a in the direction of arrow a, and the disk 40 is always accurately mounted on the disk drive unit. Thus, it will be seen that though the construction of the unit is rather very simple, the disk 40 is always prevented from being mounted on the turntable 1 in a slanted state.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims. For example, the drive pin is not necessarily made of a bearing, and the arc-like projection may be of a circular arc-like shape, or of a shape approximate to a circular arc.

This invention is applicable to the disk drive unit not only for the micro floppy disk, but also for various kinds of disks used for recording and/or reproducing information.

What is claimed is:

1. In a disk drive unit for rotating an information-transferring disk having at least a partial magnetically-attractable core to record or reproduce information, an improvement in which the unit comprises:

a turntable having a disk mounting surface;

a central pin projecting from the center of said disk mounting surface, a drive pin projecting from said turntable at an eccentric position spaced away from the position of the central pin, and a magnet for making the disk attract to the disk mounting surface;

wherein the central pin and the drive pin are fitted in respective insertion holes provided in the core of the disk, while the core is fixed to the disk mounting surface due to an attractive force provided by the magnet to the core, so that the disk may be rotated by the turntable; and a projection having a predetermined height slightly smaller than that of the disk mounting surface is so provided on the turntable as to extend outside the disk mounting surface and along an outer edge of the turntable, the projection and the drive pin being disposed on opposite sides of the central pin.

2. A disk drive unit according to claim 1, in which the drive pin insertion hole has a front side provided in coincidence with a direction of normal revolution of the drive pin, and an outer side substantially perpendicular to the front side and near an outer edge of the core.

3. A disk drive unit according to claim 2, in which the drive pin is urged in a direction of the outer side of the drive pin insertion hole by urging means.

4. A disk drive unit according to claim 3, in which the drive pin is of cylindrical shape, the upper surface of which is substantially flat, and the boundary between the upper surface and the cylindrical side surface is chamfered.

* * * * *